(12) United States Patent
Bailis

(10) Patent No.: US 6,310,945 B1
(45) Date of Patent: Oct. 30, 2001

(54) THREE TIER CLIENT/SERVER MODEL FOR LEGACY SWITCHES

(75) Inventor: Jason Bailis, Novato, CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 09/163,631

(22) Filed: Sep. 30, 1998

(51) Int. Cl.[7] .................................................. H04M 3/42
(52) U.S. Cl. ............................................ 379/207; 379/201
(58) Field of Search .................................. 379/201, 207, 379/242, 100.15; 370/469

(56) References Cited

U.S. PATENT DOCUMENTS

| | | |
|---|---|---|
| 5,226,073 | 7/1993 | Albal et al. . |
| 5,265,155 | 11/1993 | Castro . |
| 5,353,335 | 10/1994 | D'Urso et al. . |
| 5,621,787 | 4/1997 | McKoy et al. . |
| 5,754,636 | 5/1998 | Bayless et al. . |
| 5,825,863 | 10/1998 | Walker . |
| 5,889,774 * | 3/1999 | Mirashrafi et al. ......... 379/100.15 X |
| 6,111,894 * | 8/2000 | Bender et al. ...................... 379/469 |
| 6,131,163 * | 10/2000 | Wiegel ................................ 713/201 |

* cited by examiner

Primary Examiner—Creighton Smith
(74) Attorney, Agent, or Firm—Carter, Ledyard & Milburn

(57) ABSTRACT

The present invention adapts the 3 tier client/server concept to the legacy switch environment of a prepaid system providing a more highly specialized telephony switch with an improved developmental capacity. Functionality is removed from the switch to an abstraction layer through the use of an integrated network server, permitting the switch to become more specialized. The integrated network server, running Windows NT, supports open platform architecture to meet evolving system needs.

4 Claims, 5 Drawing Sheets

THREE TIER CLIENT/SERVER MODEL FOR LEGACY SWITCHES

BACKGROUND OF THE INVENTION 3-tier client/server systems in which the client/server applications and associated middleware are divided into functional units to be assigned to the client or one or more servers are well known.

Prepaid telephone systems are also well known in which a subscriber uses a telephone to access a remote data base for various services available to him as a subscriber.

The present invention adapts the 3 tier client/server concept to the legacy switch environment of a prepaid system providing a more highly specialized telephony switch with an improved developmental capacity.

As illustrated in FIG. 1, prior art telephony switches systems are highly specialized proprietary systems with an abstraction layer for interfacing with the user. Such proprietary systems are closed systems, difficult to work with and highly tuned to do a specific task.

Accordingly, it is an object of the present invention to provide a novel system and method for enhancing the scalability, robustness, and flexibility of a legacy telephony switching system.

These and many other objects and advantages of the present invention will be readily apparent to one skilled in the art to which the invention pertains from a perusal of the claims, the appended drawings, and the following detailed description of the preferred embodiments.

DESCRIPTION OF PREFERRED EMBODIMENTS

Figure 1:
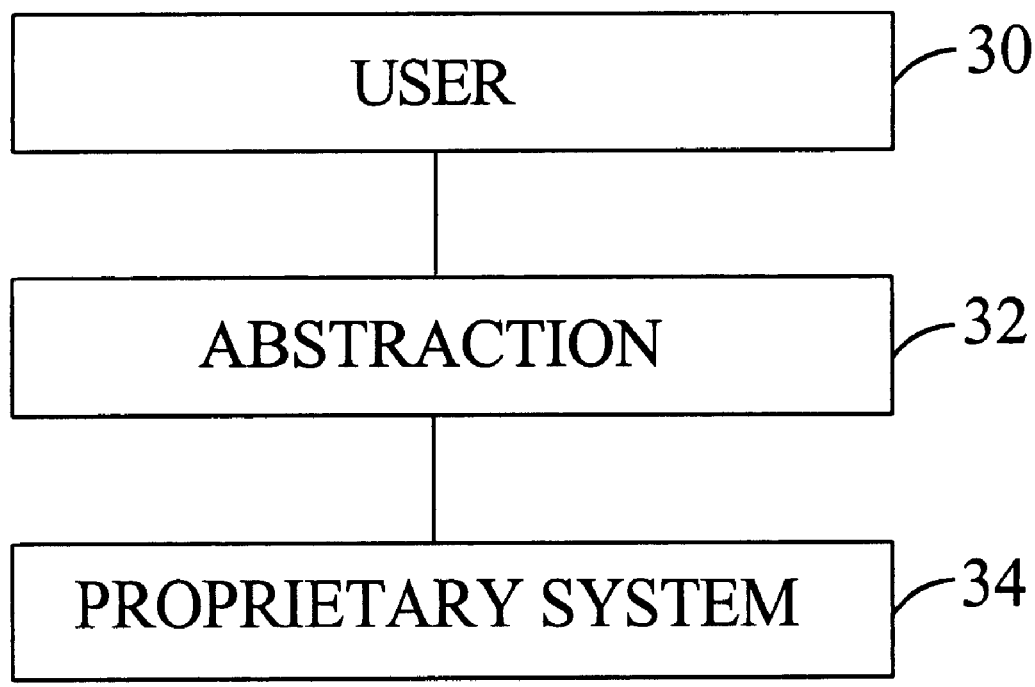
FIG. 1 is a functional block diagram illustrating the proprietary nature of prior art telephony switches.
Figure 2:
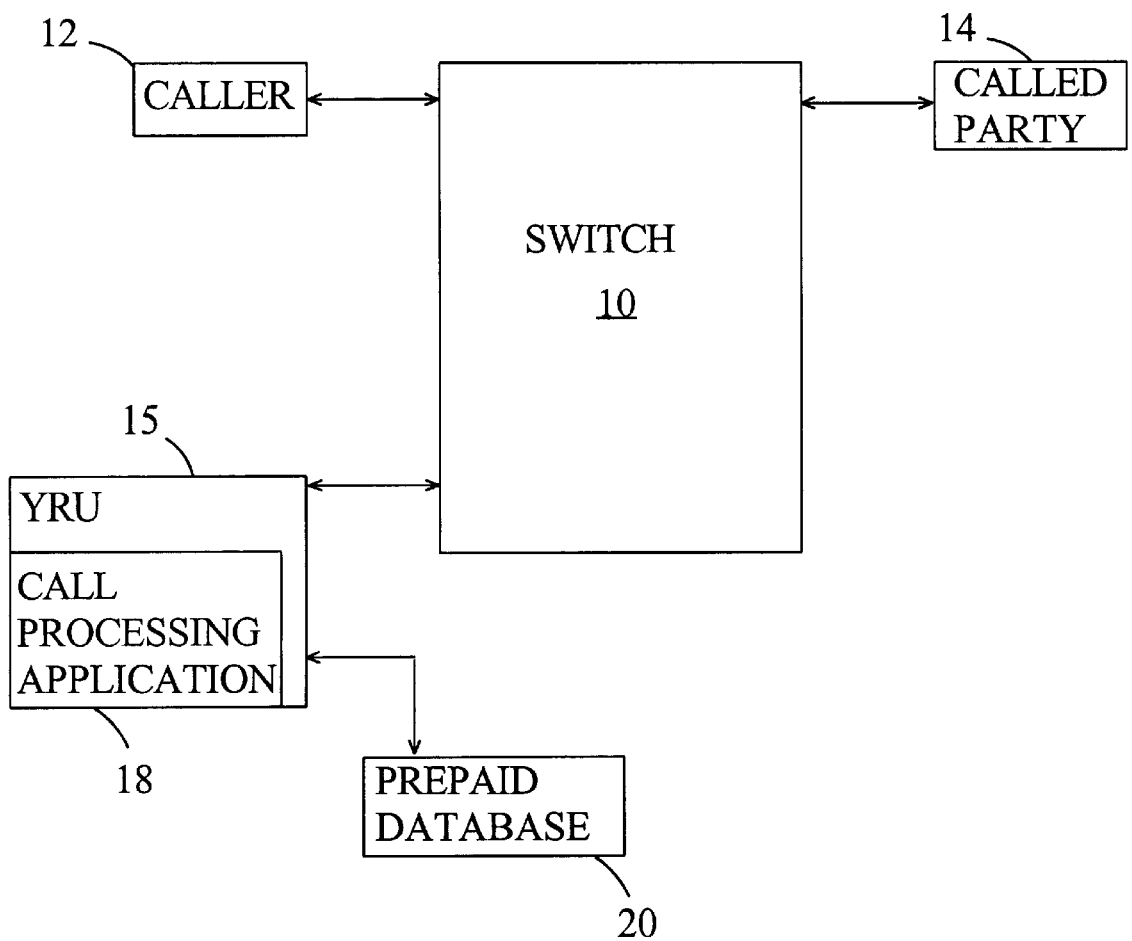
FIG. 2 is a functional block diagram illustrating the basic organization of a prepaid telephone system.

The present invention finds applicability in an enhanced services environment such as the prepaid telephone system illustrated in FIG. 2. FIG. 2 shows a suitable conventional telephone switch 10 such as the Harris Corporation 20/20 switch in a conventional public switched telephone network (PSTN) connected to large numbers of subscriber telephones such as the caller telephones 12 and the called party telephones 14. Typically connected to the switch 10 is a bank of voice response units (VRUs) 15 on which the prepaid call processing application 18 resides. The call processing application generally controls the management of a prepaid system, determining the action to be taken (e.g., determining the correctness of a PIN entry, the prompting of users for destination numbers or desired services, outdialing to a requested telephone number, etc.) during the processing of a call request.

Figure 3:
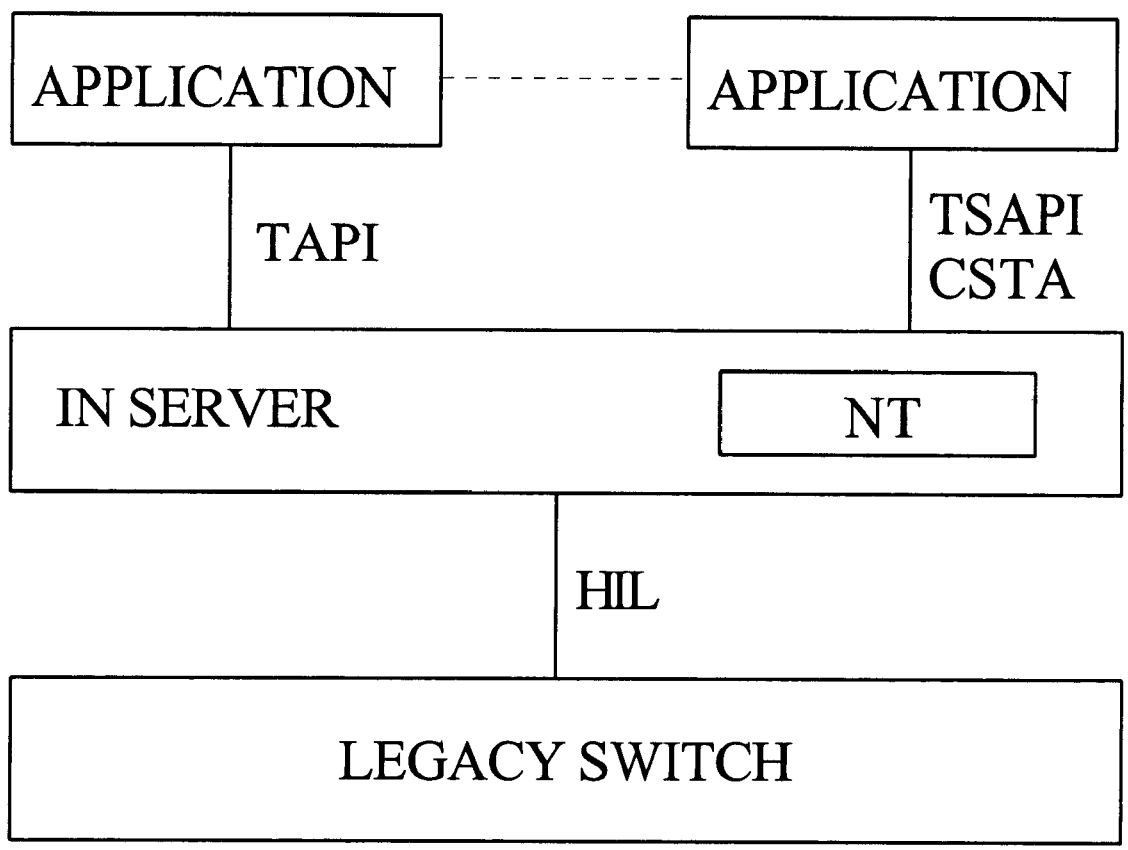
FIG. 3 is a functional block diagram illustrating the implementation of the 3 tier concept to the prepaid system through the insertion of an integrated network server running Windows NT into the abstraction layer of FIG. 1.

To implement the 3-tier client/server concept in the conventional switching system of FIG. 2, an integrated network server (IN Server) 16 running Windows NT is added to the abstraction layer of the conventional PSTN system as illustrated in FIG. 3. Physically, the IN Server is mounted on the back plane of the telephone switch 10.

The IN Server 16 runs all the host software for the Prepaid application. It also has direct access to the voice paths of the switch effectively incorporating the VRU within the switch, eliminating the need for the trunk interfaces found in outboard solutions to provide the interactive control needed to play announcements, collect digits, etc.

Figure 4:
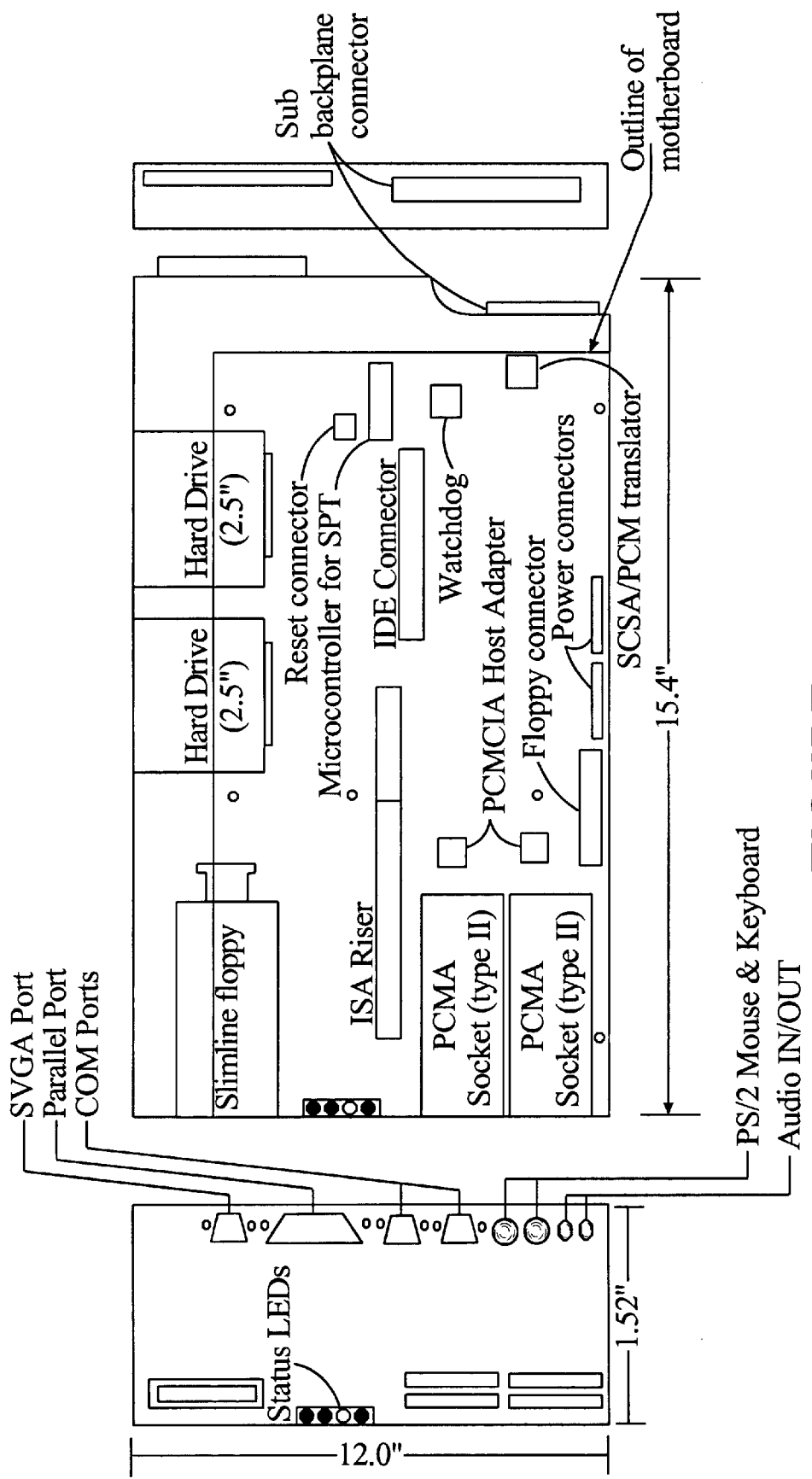
FIG. 4 is a functional block diagram illustrating the hardware of the integrated network server for one embodiment of the present invention.

In addition to operating as a VRU, the IN Server 16 can operate as a FAX Server, an IP Telephony Gateway, a file server, database server, or any other CTI Server. Further, the IN Server via Windows NT supports all telephony standards such as Dialogic's CT Connect, ECMA's CSTA, TAPI, and TSAPI. FIG. 4 illustrates the IN Server hardware for one embodiment of the present invention.

A more complete description of the various roles the IN Server 16 may perform are contained in co-pending patent applications owned by the assignee hereof, specifically: U.S. patent application Ser. No. 09/139,415, filed Aug. 25, 1998, entitled "Prepaid Card Vending Machine"; U.S. patent application Ser. No. 09/088,075, filed Jun. 1, 1998, entitled "Server Load Sharing and Redundancy"; U.S. patent application Ser. No. 09/088,070, filed Jun. 1, 1998, entitled "Unified Wordstation Application"; U.S. patent application Ser. No. 09/140,445, filed Aug. 26, 1998, entitled "Method of Time-To-Talk Calculation"; U.S. patent application Ser. No. 09/139,426, filed Aug. 25, 1998, entitled "Automated Call User Interface"; U.S. patent application Ser. No. 09/139,427, filed Aug. 25, 1998, entitled "Language Selection Menu"; U.S. patent application Ser. No. 09/087,809, filed Jun. 1, 1998, entitled "Multi Language Support"; U.S. patent application Ser. No. 09/089,243, filed Jun. 2, 1998, entitled "Hot Pluggable ISA SCSA and MVIP Busses"; U.S. patent application Ser. No. 09/139,429, filed Aug. 25, 1998, entitled "VRU Load Balancing"; U.S. patent application Ser. No. 09/163,628, filed Sep. 30, 1998, entitled "Service Creation Environment (Meta Model Editor)"; U.S. patent application Ser. No. 09/140,443, filed Aug. 26, 1998, entitled "Bedrock"; U.S. patent application Ser. No. 09/163,630, filed Sep. 30, 1998, entitled "Backing Up Microsoft Clustered Database"; U.S. patent application Ser. No. 09/139,414, filed Aug. 25, 1998, entitled "Integration of ITG To Hardware"; U.S. patent application Ser. No. 09/088,077, filed Jun. 1, 1998, entitled "Web Based Management"; U.S. patent application Ser. No. 09/088,076, filed Jun. 1, 1998, entitled "Support Of Distributed System By Standard Protocols"; U.S. patent application Ser. No. 09/163,629, filed Sep. 30, 1998, entitled "Active Channel Virtual Office"; U.S. patent application Ser. No. 09/139,428, filed Aug. 25, 1998, entitled "Web-Based Access To An Enhanced Services System By Institutions, Point Of Sale And End Users"; each of which is incorporated herein by reference.

Figure 5:
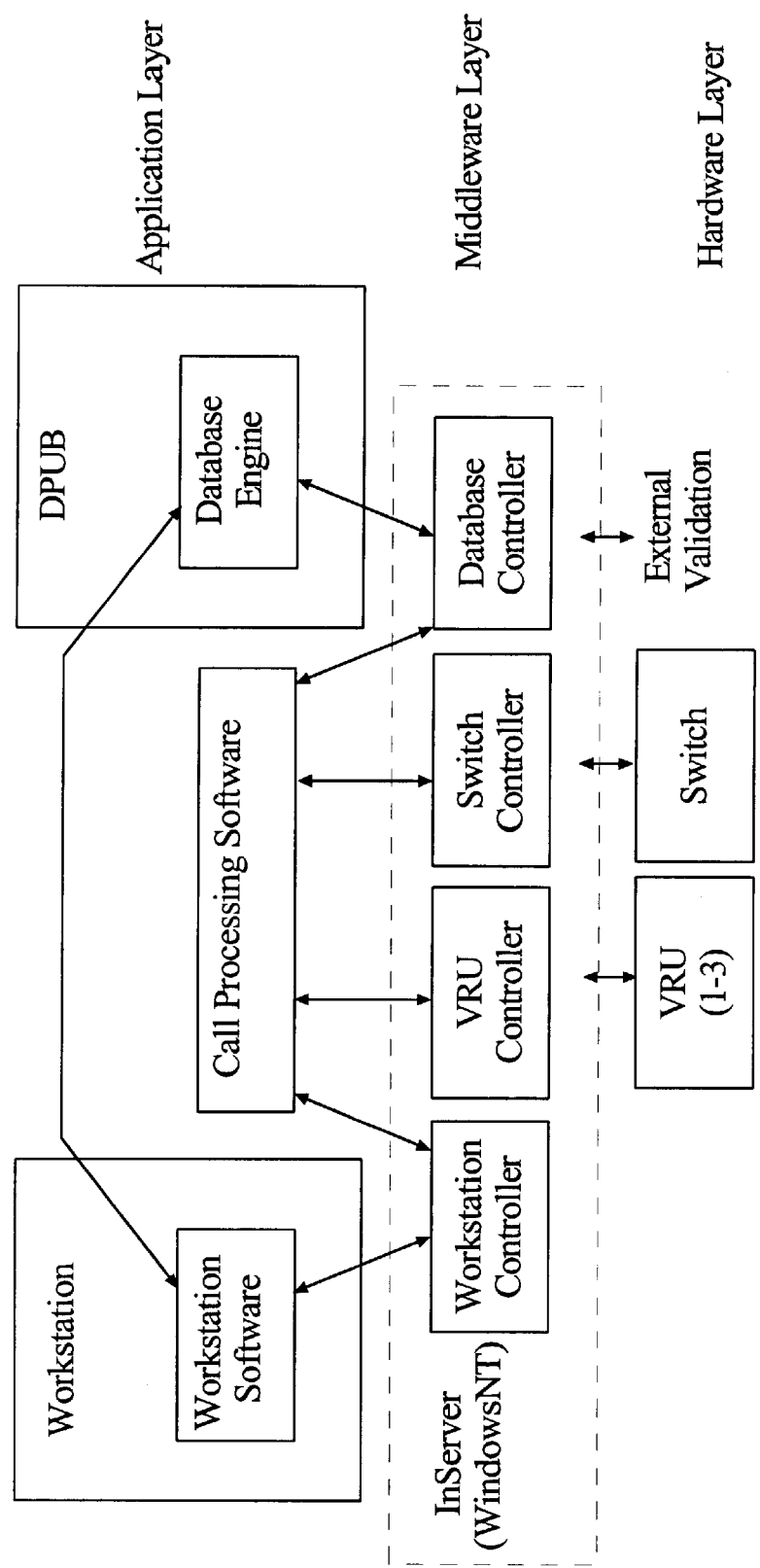
FIG. 5 is a functional block diagram illustrating the spread of the prepaid functionality across the three tiers of one embodiment of the present invention.

By incorporating the IN Server 16 into the abstraction layer, control is provided at a higher level allowing buffering at the middle tier for the lower tier while permitting the use of software tools (e.g., NT tools) at a higher level. Further, removing functionality from the switch permits the switch to become more focused on specific tasks (i.e., more highly specialized). FIG. 5 illustrates the division of the prepaid functionality among the various tiers for one embodiment of the present invention.

Benefits of applying the 3-tier concept to the prepaid system include enhanced scalability in that the present invention supports linear growth reducing the cost of initial investment. Furthermore, the system's flexibility and open platform architecture is cost effective in meeting existing and evolving business needs. The middle layer, due to the user friendliness of Windows NT, provides an environment for easy development. Better tools are available for Business Rule development and user services are freed from database detail. The fault tolerance and extensive security features of Windows NT also guarantees database integrity.

Further, utilizing less switch functionality allows the switch to do fewer things better, faster, and cheaper. By moving the voice processing functionality to the IN Server 16 (i.e., abstraction layer), the host (previously responsible for the voice processing) is also relieved.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a telephone switching system having a switch with both control and switching functions, and plural software applications for controlling the operation of the switch in accordance with selected business rules, the method of improving the operation of a telephone switch comprising the steps of:
   a) providing a server intermediate the plural software applications and the switch; and,
   b) moving selected control functions from the switch to the server thereby (i) to provide a more specialized switch and (ii) to permit the server to protect the switch from violation of business rules by the plural software applications.

2. A system comprising:
   a highly specialized telephony scalable switch with a proprietary protocol connected to a PSTN;
   plural user friendly applications for controlling the operation of said switch; and,
   a server, programmable for business rules in real time, operably connected to said switch and to said plural applications (i) for providing isolation between said switch and said applications, (ii) for increasing the scalability of said switch, and (iii) for increasing maintainability of said system.

3. A system including a host server and a physical switch having a switch computer and digital switching means, the improvement comprising the addition of an abstraction layer between said computer and said physical switches, said abstraction layer including:
   non-proprietary interface;
   suitable conventional software development tools;
   means for adapting to use suitable conventional switch components including libraries and dynamic link libraries;
   hot pluggable interface means; and
   means for adding a host computer,
   said abstraction layer being at least as robust as said switch insofar as fans, power supplies, integrated diagnostics, and electromagnetic radiation limits are concerned,
   said abstraction layer being capable of supporting software applications of greater complexity, speed, and increased memory than said host server, and
   said abstraction layer providing direct access to said switch.

4. A method of increasing the functionality of a legacy telephone switch comprising the steps of:
   a) providing a legacy switch controllable by at least one software application; and
   b) providing an abstraction layer for the switch thereby increasing the specialization of the switch and protecting the switch from the software applications.

* * * * *